Figures 1, 2:
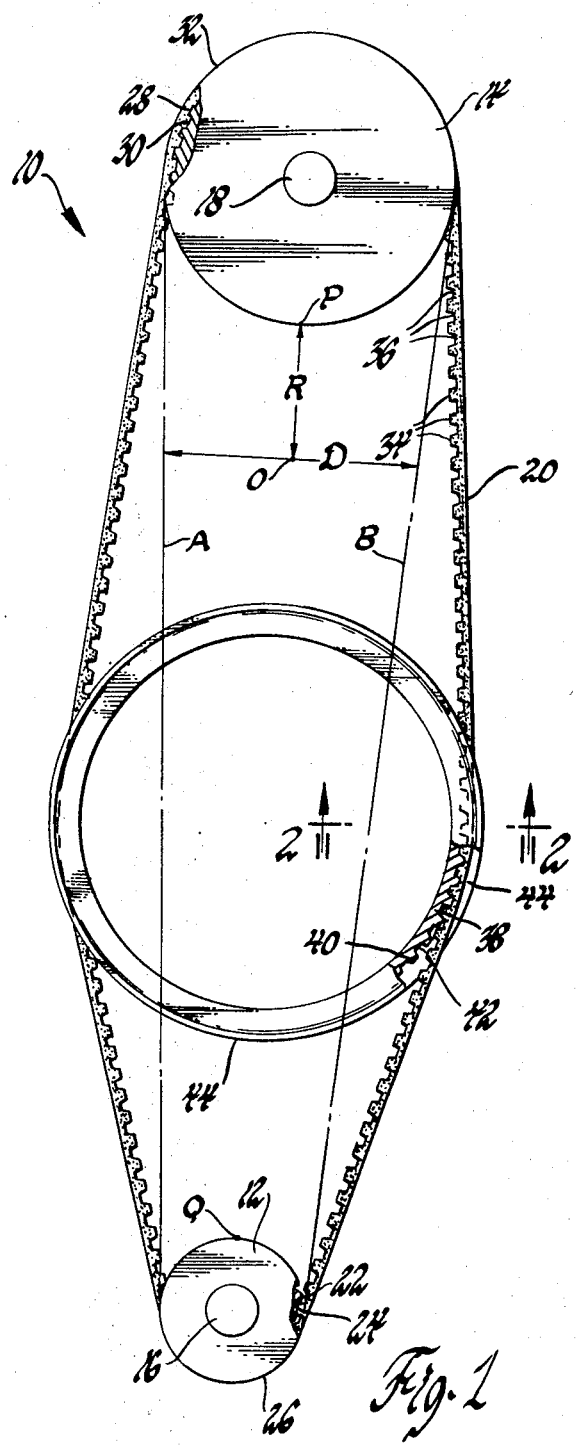

United States Patent

[11] 3,574,287

[72] Inventor Walter C. Heidacker
 Bloomfield Hills, Mich.
[21] Appl. No. 859,365
[22] Filed Sept. 19, 1969
[45] Patented Apr. 13, 1971
[73] Assignee General Motors Corporation
 Detroit, Mich.

[54] BELT TENSION-ADJUSTING DEVICE
 9 Claims, 2 Drawing Figs.
[52] U.S. Cl. .................................................. 74/242.1,
 74/231
[51] Int. Cl. ...................................................... F16h 7/12,
 F16g 1/28
[50] Field of Search ........................................... 74/242.1,
 242.1 (TA), 231 (C)

[56] References Cited
UNITED STATES PATENTS
3,117,459 1/1964 Schweitzer .................... 74/231(C)
3,500,693 3/1970 Wright .......................... 74/242.1

*Primary Examiner*—Leonard H. Gerin
*Attorneys*—Warren E. Finken, A. M. Heiter and John P. Moran

ABSTRACT: A belt-tension-adjusting device for a toothed belt and dual pulley drive arrangement, including an intermediate toothed pulley or sprocket wheel having an outside diameter larger than the respective diameters of the two pulleys, wherein the belt may be tensioned by manually holding one side of the belt away from the intermediate pulley, rotating the latter toward one of said dual pulleys, and releasing the side of the toothed belt to mesh with the teeth of the intermediate pulley in its new location.

PATENTED APR 13 1971

3,574,287

INVENTOR.
Walter C. Heidacker
BY
John P. Moran
ATTORNEY

BELT TENSION-ADJUSTING DEVICE

This invention relates generally to belt and toothed pulley drive arrangements and more particularly to a belt-tension-adjusting device for use with such an arrangement.

The invention provides an improved belt takeup or adjusting device which is adaptable so as to effect rapid and efficient adjustment of a conventional cogged belt and toothed pulley or sprocket wheel drive-transmitting device, such as a vehicular timing belt, without having to resort to tools or fasteners.

Accordingly, an object of the invention is to provide an improved toothed pulley and cogged belt drive-transmitting adjusting arrangement of the type described above.

Another object of the invention is to provide a belt-tension-adjusting mechanism which includes an intermediate adjusting sprocket wheel associated with a pair of driving and driven sprocket wheels, wherein the adjusting sprocket is free floating, in that it has no hub or mounting bracket and requires no bearings, and which may be manually adjusted without the use of tooling.

These and other objects and advantages of the invention will become more apparent when reference is made to the following specification and accompanying drawings, wherein:

FIG. 1 is an end view, in partial cross section, of a dual pulley and belt arrangement embodying the invention; and FIG. 2 is a cross-sectional view taken along the plane of line 2-2 of FIG. 1, and looking in the direction of the arrows.

Referring now to the drawings in greater detail, FIG. 1 illustrates a drive-transmitting mechanism 10 including a pair of toothed pulleys or sprocket wheels 12 and 14, one of which, say, pulley 12, is driven by a shaft 16 and serves as the driving member and the other of which is the driven member, driving a shaft 18, the latter being connected to a vehicular engine accessory (not shown).

The pulleys 12 and 14 are interconnected by a cogged drive belt 20. Equally spaced transverse sprockets or riblike teeth 22, each with adjacent grooves or notches 24 are formed around the outer periphery of the pulley 12, the outer faces of the pulley 12 being large enough in diameter to serve as retaining flanges 26 for the belt 20. Similar teeth or sprockets 28, each with adjacent grooves or notches 30, are formed around the outer periphery of the driven pulley 14. Flanges 32 are formed at the ends of the teeth 28 to keep the belt 20 aligned on the pulley 14.

Matching transverse sprockets or teeth 34 with adjacent grooves or notches 36 are formed around the inner periphery of the belt 20. The teeth 34 cooperate with the transverse notches 24 and 30 of the sprockets 12 and 14, respectively.

It is well known that, as conventional belts such as the belt 20 become worn, they tend to stretch and, hence, could slip out of mating contact with pulley teeth such as the teeth 22 and 28, thus requiring some means of adjustment therefor.

A third sprocket wheel or toothed pulley 38, having transverse teeth 40 and adjacent grooves 42 formed thereon, is used in the invention to serve as such adjustment means. The pulley 38 is illustrated in FIG. 1 as being larger in diameter than the pulleys 12 and 14 and is located at assembly intermediate the pulleys 12 and 14. It is preferably comprised of lightweight material, such as aluminum or plastic. The grooves 42 are formed such that they mesh with the projections or teeth 34 of the belt 20. Collars or flanges 44 (FIG. 2), formed on sides of the pulley 38, keep the pulley 38 radially aligned on the belt 20, without requiring a mounting bracket, hub or bearings.

The sprocket 38 is originally axially positioned so that the belt 20 is properly tensioned, resulting in a secure meshing relationship between the belt 20 and all three sprockets 12, 14 and 38.

Now, should the belt 29 stretch during its operational life, it is merely necessary to manually pull one side of the belt 20 away from the sprocket 38, rotate the intermediate or largest sprocket 38 toward one of the pulleys 12 or 14 an amount sufficient to once again bring the belt into a tensioned or taut condition, and then release the withdrawn side of the belt 20 to mesh with the grooves 42 on the pulley 38 in its new location, where the latter will remain during subsequent operation until once again manually relocated.

Insofar as the size of the intermediate or tensioning pulley 38 is concerned, the diameter thereof is preferably larger than that of both the driving and driven pulleys 12 and 14, as illustrated in FIG. 1. It will be appreciated that the tensioning pulley 38 must, in all adjusted positions, have a diameter sufficient to spread the opposing portions of the belt outwardly from their straight positions A and B so that the contacting portions of the belt engage the tensioning pulley on opposite sides with a high pressure to hold it in position and to provide a large capacity adjustment. However, as a limiting factor, the smallest possible diameter for the third or intermediate pulley 38 which would ensure its function as a belt-tensioning device would be a diameter which is merely larger than the diameter of the smaller pulley 12, provided such a pulley 38 is positioned close to the pulley 12. It should be noted that a pulley of the minimal size just described could not be moved much toward the larger pulley 14 to spread the sides of the belt 20, and thus would only provide a limited degree of tensioning should the belt 20 stretch.

Accordingly, as a practical matter, for a large range of adjustment, the smallest diameter for the intermediate pulley 38 should be a diameter which is slightly larger than the distance $D$ (FIG. 1) between opposing sides of the belt 20, as measured through a point O which is approximately half this distance, represented by $R$ in FIG. 1, away from the peripheral point P of the larger pulley 14 closest to the peripheral point Q of the smaller pulley 12. Such a pulley would provide maximum belt-tensioning adjustment in that it could be moved along a centerline between the axes of the pulleys 12 and 14, as required due to stretching of the belt 20, from an initial position adjacent the point P to a final position adjacent the point Q.

It may be realized that in operation one side of the belt, say side A, will be drawn tight, while the opposite side B will be loosened, if the driving pulley 12 is rotating in a counterclockwise direction as viewed in FIG. 1, thereby moving the center of the tensioning pulley 38 toward the right in FIG. 1, but maintaining its respective distances from the pulleys 12 and 14.

It should be apparent that the invention provides an improved belt-tension-adjusting apparatus which may be readily utilized without requiring any tooling, other than an operator's hands, and which requires no mounting facilities or bearings.

While but one embodiment of the invention has been shown and described, additional modifications thereof are possible.

I claim:

1. A belt-tensioning device comprising a driving pulley mounted for rotation about a fixed axis, a driven pulley mounted for rotation about a fixed axis spaced apart from said first-mentioned fixed axis, an interconnecting drive-transmitting belt mounted around said driving and driven pulleys, a plurality of mating alternately positioned teeth and grooves formed on the outer peripheries of each of said driving and driven pulleys and on the inner periphery of said belt, and a single tension-inducing toothed pulley located intermediate said driving and driven pulleys and bearing against oppositely disposed inner toothed surface portions of said belt, thereby tensioning said belt and being maintained in said location by said belt.

2. A belt-tensioning mechanism comprising a driving pulley mounted for rotation about a fixed axis, a driven pulley mounted for rotation about a fixed axis spaced apart from said first-mentioned fixed axis, an interconnecting drive-transmitting belt mounted around said driving and driven pulleys, a plurality of mating alternately positioned teeth and grooves formed on the outer peripheries of each of said driving and driven pulleys and on the inner periphery of said belt, a third larger diameter pulley having alternately positioned teeth and grooves formed on the outer periphery thereof and mounted intermediate said driving and driven pulleys such that said teeth on said belt mesh with said grooves on oppositely disposed portions of said third larger diameter pulley in an axial location as required to tension said belt.

3. A belt-tensioning device comprising a driving pulley mounted for rotation about a fixed axis, a driven pulley mounted for rotation about a fixed axis spaced apart from said first-mentioned fixed axis, an interconnecting drive-transmitting belt mounted around said driving and driven pulleys, a plurality of mating alternately positioned teeth and grooves formed on the outer peripheries of each of said driving and driven pulleys and on the inner periphery of said belt, and a single tension-inducing toothed pulley having a diameter intermediate the diameter of said driving and driven pulleys and located intermediate said driving and driven pulleys and bearing against oppositely disposed inner toothed surface portions of said belt, thereby tensioning said belt and being maintained in said location by said belt.

4. A belt-tension-adjusting device for a toothed belt and dual pulley drive arrangement comprising a toothed pulley located intermediate said dual pulleys and having an outside diameter larger than the respective diameters of the two pulleys and in contact at oppositely disposed portions thereof with said toothed belt, providing for the tensioning of said belt by the manual lifting of one side of said belt away from said intermediate pulley, the rotating of said intermediate pulley along the other side thereof toward one of said dual pulleys, and the releasing of said one side of said toothed belt to mesh with the teeth on said intermediate pulley in its new location.

5. A belt-tension-adjusting device for a toothed belt and dual pulley drive arrangement comprising a toothed pulley located intermediate said dual pulleys and having an outside diameter intermediate the respective diameters of the two pulleys and in contact at oppositely disposed portions thereof with said toothed belt, providing for the tensioning of said belt by the manual lifting of one side of said belt away from said intermediate pulley, the rotating of said intermediate pulley along the other side thereof toward one of said dual pulleys, and the releasing of said one side of said toothed belt to mesh with the teeth on said intermediate pulley in its new location.

6. A belt-tension-adjusting device for a toothed belt and dual pulley drive arrangement including a larger and a smaller pulley, said belt defining straight sides when not spread intermediate said larger and smaller pulleys, said device comprising a toothed pulley located intermediate said dual pulleys and having an outside diameter slightly larger than the distance between said straight sides of said toothed belt through a point on the centerline between the axes of said dual pulleys, said point being slightly more than half said distance between said straight sides of said toothed belt away from the adjacent edge of said larger pulley and in contact at oppositely disposed portions thereof with said toothed belt, providing for the tensioning of said belt by the manual lifting of one side of said belt away from said intermediate pulley, the rotating of said intermediate pulley along the other side thereof toward said smaller pulley, and the releasing of said one side of said toothed belt to mesh with the teeth on said intermediate pulley in its new location.

7. A belt-tension-adjusting device comprising a driving pulley mounted for rotation about a fixed axis, a driven pulley mounted for rotation about a fixed axis spaced apart from said first-mentioned fixed axis, said driven pulley having a diameter different from the diameter of said driving pulley, an interconnecting drive-transmitting belt mounted around said driving and driven pulleys, a plurality of mating alternately positioned teeth and grooves formed on the outer peripheries of each of said driving and driven pulleys and on the inner periphery of said belt, a tensioning pulley having alternately positioned teeth and grooves formed on the outer periphery thereof and mounted intermediate said driving and driven pulleys such that said teeth on oppositely disposed portions of said belt mesh with said grooves on said tensioning pulley in an axial location whereat said belt is spread as required to tension said belt, said tensioning pulley being axially movable toward one of said driving and driven pulleys by manually lifting one side of said belt away from one side of said tensioning pulley, rotating said tensioning pulley along the other side thereof toward said one of said driving and driven pulleys and releasing said one side of said belt to mesh with said one side of said tensioning pulley in a new location as required to once again tension said belt after said belt has stretched.

8. The device described in claim 7, wherein said intermediate pulley is larger in diameter than the respective diameters of said driving and driven pulleys.

9. The device described in claim 7, wherein said tensioning pulley has a diameter intermediate the diameters of said driving and driven pulleys and is rotated toward the smaller of said driving and driven pulleys.